US006400559B1

(12) United States Patent
Köhler et al.

(10) Patent No.: US 6,400,559 B1
(45) Date of Patent: Jun. 4, 2002

(54) CURRENT DISTRIBUTOR

(75) Inventors: Klaus Werner Köhler, Speyer; Jürgen Fischbach, Schlangenbad; Christian Kölbel, Taunusstein; Günther Horaczek, Watzelhain, all of (DE)

(73) Assignee: EFEN Elektrotechnische Fabrik GmbH, Eltville (DE)

(*) Notice: Subject to any disclaimer, the term of this patent is extended or adjusted under 35 U.S.C. 154(b) by 0 days.

(21) Appl. No.: 09/886,785

(22) Filed: Jun. 22, 2001

(30) Foreign Application Priority Data

Jun. 24, 2000 (DE) ........................................ 100 30 954

(51) Int. Cl.[7] ................................................ H02B 1/04

(52) U.S. Cl. ....................... 361/648; 307/147; 361/611; 439/215

(58) Field of Search .......... 174/59, 68.2; 307/147–149; 439/207, 215, 94, 716, 721–724; 361/601, 611, 622, 624, 637, 641, 643, 648

(56) References Cited

U.S. PATENT DOCUMENTS 5,340,326 A * 8/1994 LeMaster .................... 439/207
5,615,079 A * 3/1997 Eggert et al. ............... 361/637
5,629,831 A * 5/1997 Eggert et al. ............... 361/624
6,123,562 A * 9/2000 King et al. ................. 439/215
6,259,617 B1 * 7/2001 Wu ............................ 363/144

FOREIGN PATENT DOCUMENTS

DE 42 07 443 A1 6/1993
DE 42 10 382 A1 10/1993
DE 44 20 072 A1 12/1994
DE 43 27 282 A1 2/1995
DE 295 08 610 U1 9/1995
DE 44 40 602 A1 5/1996
DE 196 39 785 A1 4/1998
DE 298 03 769 U1 6/1998
DE 198 33 983 A1 2/2000

* cited by examiner

*Primary Examiner*—Gerald Tolin
(74) *Attorney, Agent, or Firm*—Killworth, Gottman, Hagan & Schaeff, L.L.P.

(57) ABSTRACT

The described current distributor has a bus bar, a plug socket connected to the bus bar, at least one contact element which comprises an access connection, a consumer tapping and an element connecting the access connection and the consumer tapping, at least one plug connection for the plug contacts of a protective switch, which has a plug socket of the bus bar and an access socket of a contact element, and two signaling lines. In order to produce such a current distributor inexpensively and to ensure reliability of operation, it is provided in accordance with the invention that the contact element comprises a one-piece member.

19 Claims, 11 Drawing Sheets

Figure 1:
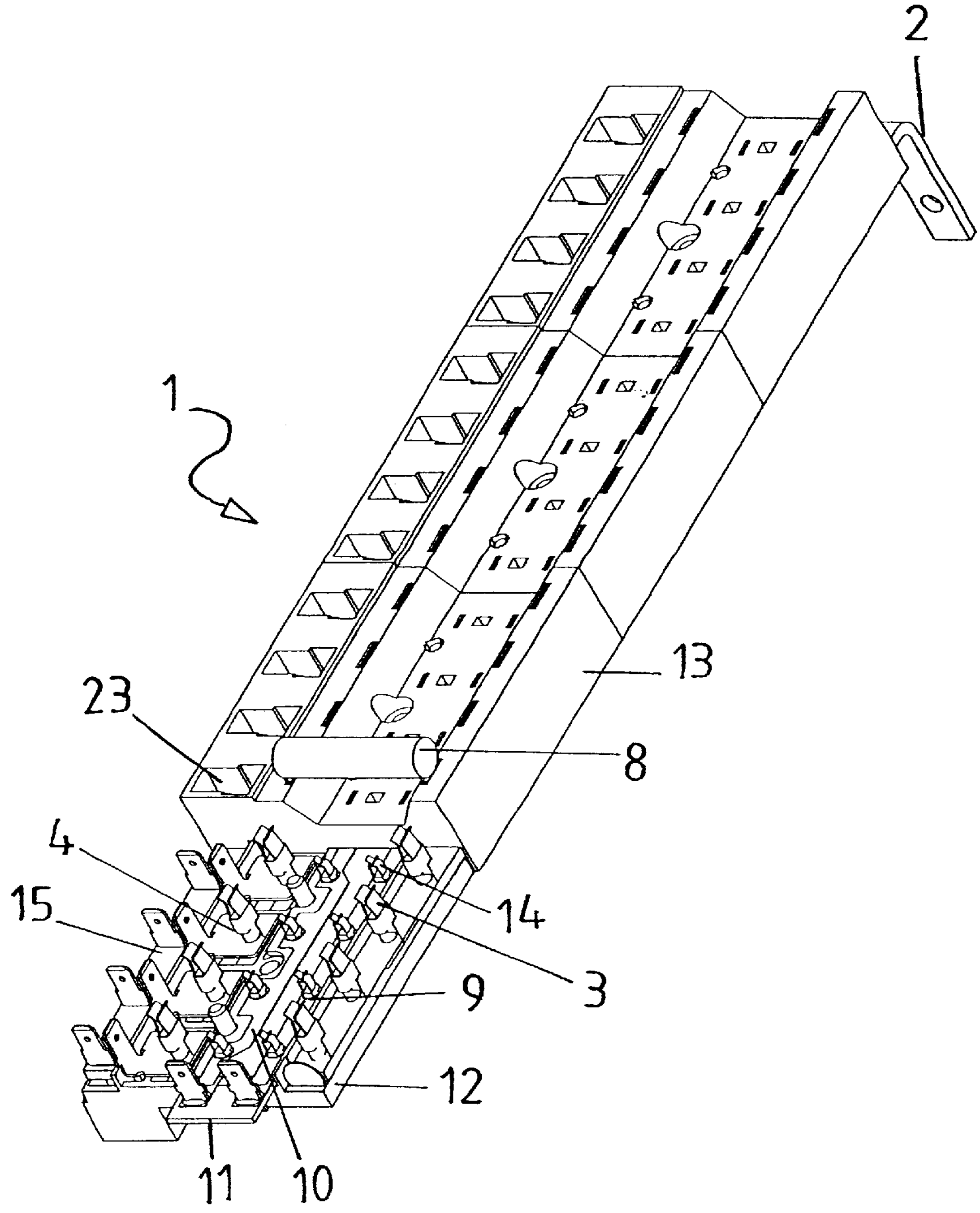

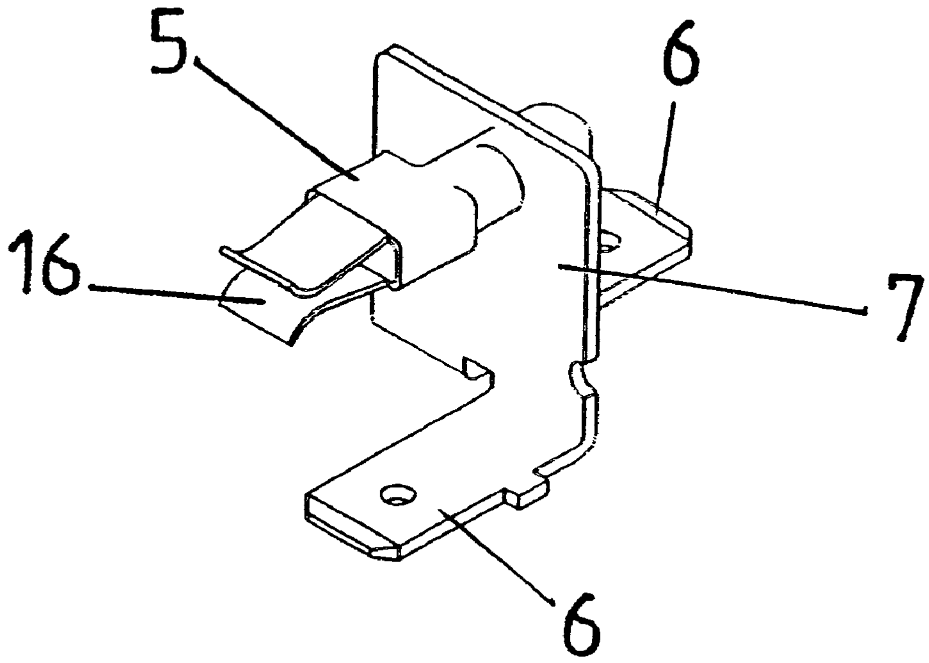
*Fig. 2* A
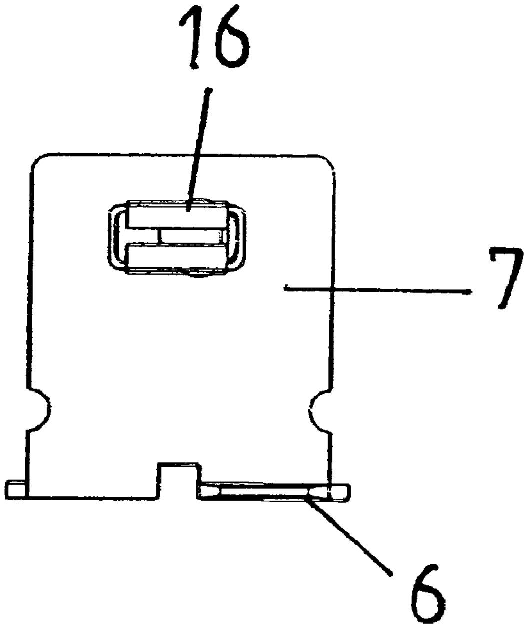
*Fig. 2* B

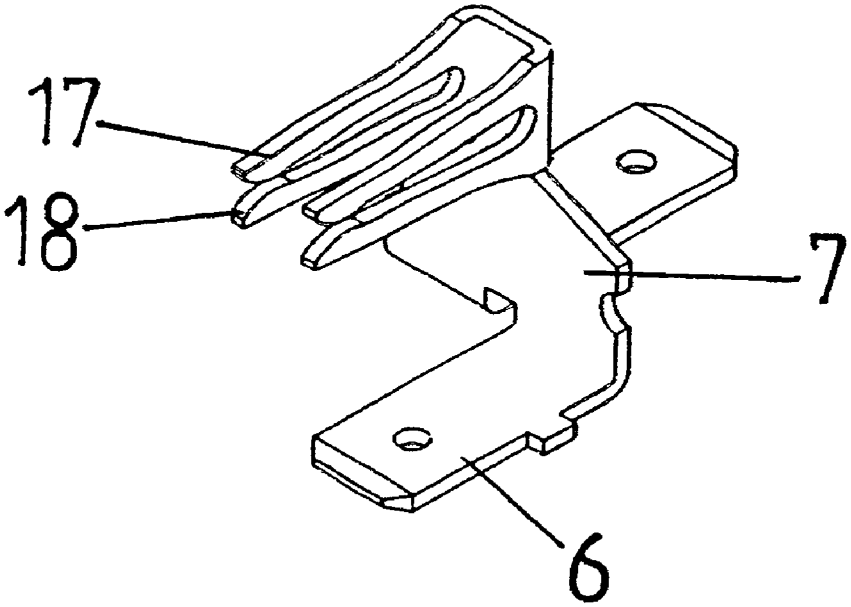
*Fig. 3* A
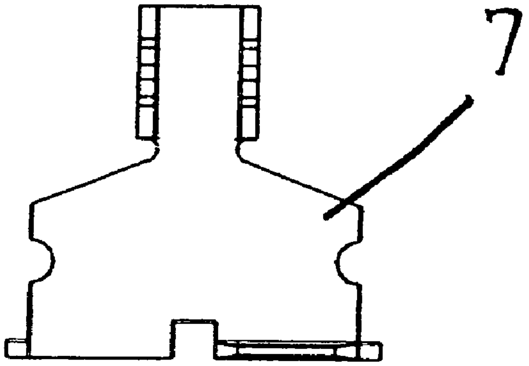
*Fig. 3* B

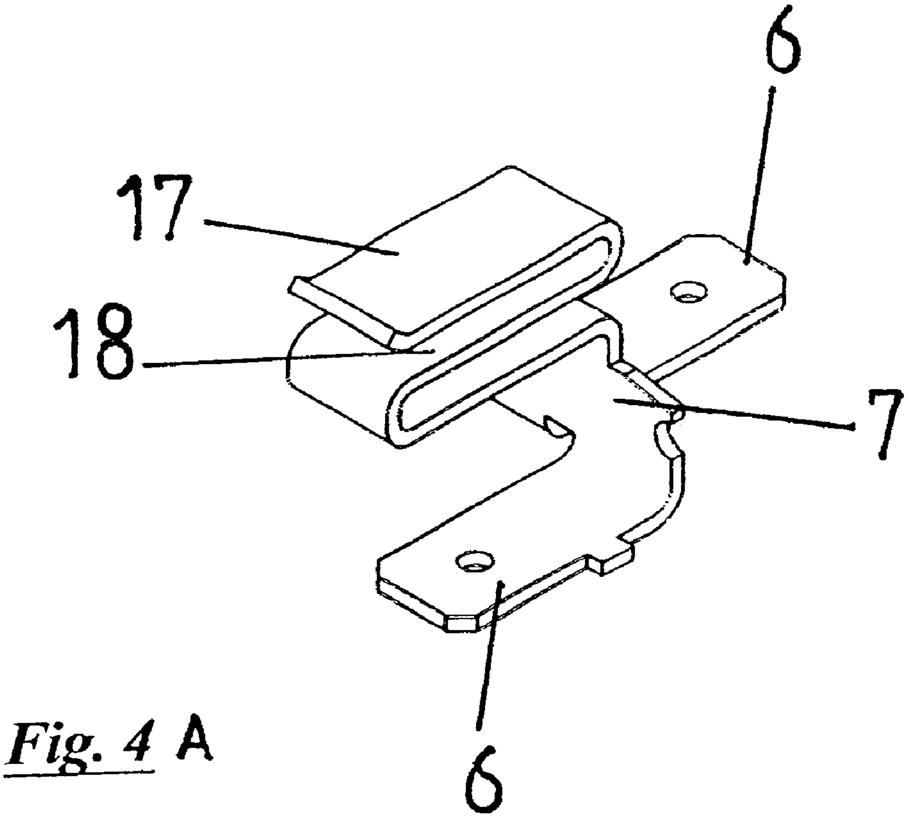
*Fig. 4* A
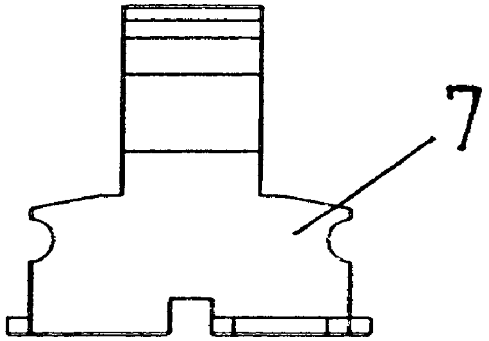
*Fig. 4* B

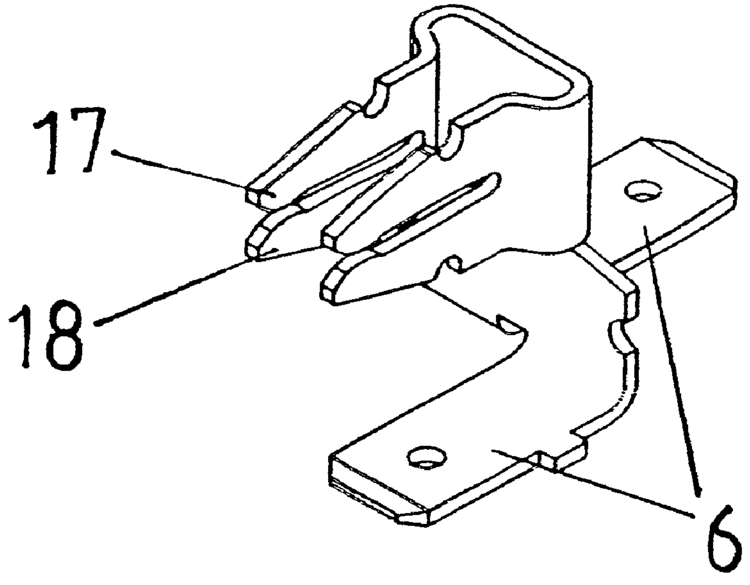
*Fig. 6* A
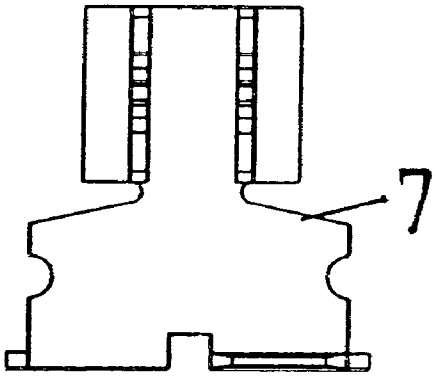
*Fig. 6* B

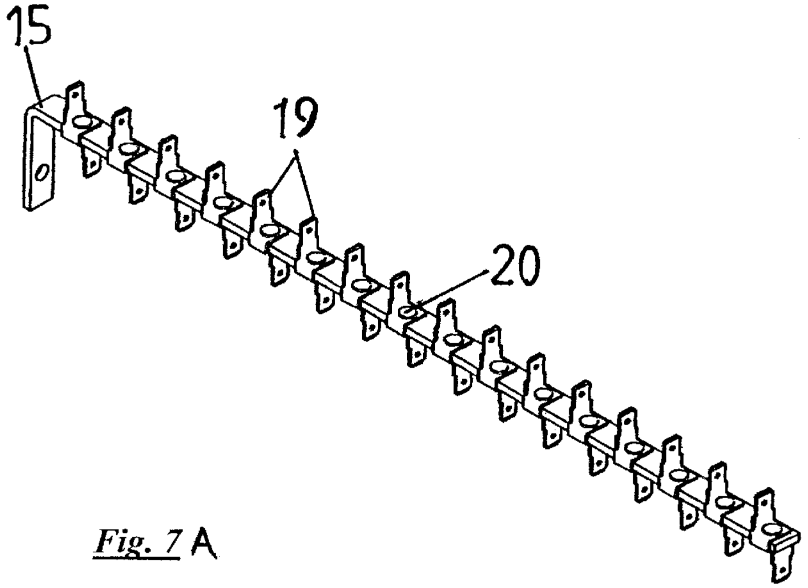
*Fig. 7* A
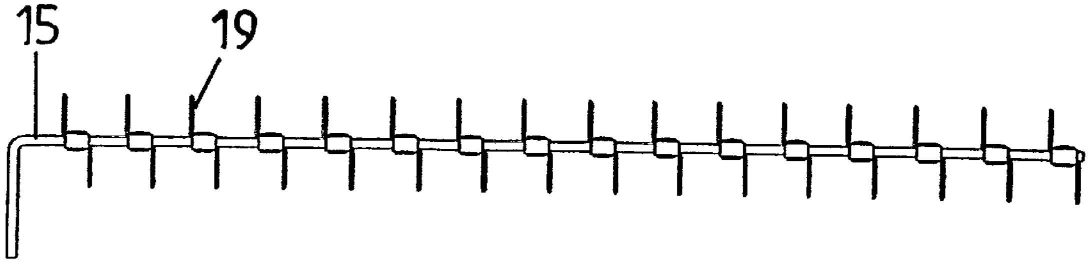
*Fig. 7* B

CURRENT DISTRIBUTOR

CROSS-REFERENCE TO RELATED APPLICATION

This is application claims the benefit of German Patent Application 100 30 954.2 filed Jun. 24, 2000 by Klaus Werner Köhler et al. entitled CURRENT DISTRIBUTOR.

The present invention concerns a current distributor comprising a bus bar, at least one plug socket which is connected to the bus bar, at least one contact element which comprises an access connection, a consumer tapping and an element connecting the access connection and the consumer tapping, at least one plug connection for the plug contacts of a protective switch, wherein the plug connection has a plug socket of the bus bar and an access socket of a contact element, and at least two signalling lines.

A current distributor of that kind is known for example from DE 44 40 602. The current distributor serves to provide at least one fuse-protected tapping from the bus bar. The current distributor is used for example in telecommunication engineering, in particular in 60V direct-current telephone systems. Frequently the current distributor has a whole series of plug connections for flat protective switches which can be arranged in a row. The individual protective switches are connected on the one hand to the bus bar by way of a respective plug socket and on the other hand are connected to a contact element by way of the access connection. When the protective switch is switched on, the contact element is connected to the bus bar so that it is possible to access the bus bar by way of the consumer tapping of the contact element. In that case each contact element is individually safeguarded with its own protective switch, in relation to the bus bar.

The neutral conductor or earth potential can be fed separately to the consumers. It is however also possible to provide a second bus bar which provides the earth potential.

The signalling lines only serve to signal a triggered protective switch to a corresponding signalling element so that, without each individual protective switch having to be manually checked, it is possible to register whether a protective switch has triggered because of an overload. In the embodiment described in DE 44 40 602 the signalling lines have plug contacts. The protective switches are of such a design configuration that they have additional blade contacts for the signalling lines and an auxiliary switch. If the protective switch is triggered, in other words, if the connection between the bus bar and the contact element or the consumer connected to the contact element is broken because of an overload, at the same time the auxiliary switch of the protective switch switches and connects the two signalling lines. The resulting short-circuit between the two signalling lines can be detected at another location. Equipping the protective switches with auxiliary switches and equipping the signalling lines of the current distributor with plug contacts represents a considerable complication and expenditure. In addition, the arrangement of the four plug contacts for the protective switch must be very precise in order to permit assembly of the protective switch. Just minor deformation of the flat plug contacts of the protective switch, which frequently occurs, can result in incorrect assembly and thus malfunctioning of the component.

The plug connections for the contact elements and the signalling lines are combined on a printed circuit board in the known construction. In that construction therefore the contact element is formed from an access connection which is soldered into the circuit board, a consumer tapping which is soldered into the circuit board and an element in the form of a conductor track, which connects the access connection and the consumer tapping. While the contact element can be loaded with the full consumer load, that is to say for example with currents of up to 63 amperes in the case of two protective elements switched in parallel, in general a current of less than 1 ampere flows through the signalling circuit. In the known current distributor therefore the copper lining of the substrate of the circuit board must be designed for the full current load. As the circuit board is lined in a unitary or uniform manner, accordingly the copper lining of the signalling circuit is also designed for the full load, although here there is only a small load to be expected. The costs for that circuit board are therefore disproportionately high. As the embodiment of DE 44 40 602 has two consumer tappings which extend perpendicularly from the circuit board in opposite directions, the circuit board must in addition be lined on both sides. In the equipment assembly procedure it is then additionally necessary for at least one side to be equipped and soldered by hand. The consequence is high production costs for the known current distributor. In addition it has been found that, in a situation involving a short-term overload, due to the generation of heat at the contact element, the access connection and/or the consumer tapping can come unsoldered before the protective conductor triggers. The consequence of this is that that plug location cannot be used again for a protective switch.

The known structure has a second bus bar which supplies the neutral or earth potential. The second bus bar has connection contacts which extend perpendicularly from the bus bar in opposite directions. For the purposes of fixing the connection contacts on the second bus bar the connection contacts have legs which are fitted into bores in the bus bar and then soldered. In this case also automatic component fitment and soldering is only possible from one side. The other side has to be soldered by hand. In a situation involving a short-term overload, the region of the connection contacts also involves a generation of heat which can result in unsoldering and subsequent detachment of the connection contacts from the second bus bar before the protective switch triggers.

Therefore the object of the present invention is to provide a current distributor which can be inexpensively produced and which ensures reliable operation, in particular overcoming the above-indicated disadvantages.

In accordance with the invention that object is attained in that the contact element comprises a one-piece member. In other words, the access connection, the consumer tapping and the element connecting the access connection and the consumer tapping comprise a single member. That ensures that for example in the case of a temporary overload current, unsoldering of the access connection or the consumer tapping is prevented. Particularly in the case of ac networks the overload current can assume very high values. The one-piece design configuration also affords the advantage that there is no need to have recourse to the copper lining of the circuit board for making the connection between the access connection and the consumer tapping. The contact element can admittedly be fitted onto the circuit board, but it is preferably completely separate therefrom. Accordingly the copper lining can be selected to be markedly thinner as it only has to be designed for the load of the signalling circuit in which only currents of less than 1 ampere flow. In addition, lining is only required on one side, thereby permitting automatic component fitting and soldering. The manufacturing costs of the circuit board are therefore considerably less.

For many situations of use, it may be advantageous for the access connection of the contact element to have a secondary or separate plug which is fitted thereinto, being for example soldered in or pressed in. That permits individual adaptation of the contact element to the protective switch used. That also provides an optimum plug-in force for the flat or blade contact of the protective switch. Another possible option involves ac uses and the like in other current distribution arrangements, in a stationary situation or in vehicles.

It is particularly preferred if the access connection is in the form of an access socket. In that case therefore the access socket is also produced in one piece with the contact element. That avoids unwanted contact resistances. In addition, the secondary plug cannot become unsoldered in a situation involving a short-term overload.

A particularly preferred embodiment provides that the contact element is formed from a stamped bent member. A stamped bent member is extremely inexpensive to produce. The contact element is therefore for example firstly stamped out of a metal sheet, preferably of a thickness of between 0.4 and 1.2 mm, particularly preferably of a thickness of about 0.8 mm, and then bent into the corresponding shape.

That ensures that the contact element does not have any contact transitions and is of a constant thickness.

A particularly desirable embodiment is one in which the contact element, in the region of the access socket, has two portions which form a receiving means for the plug contacts of the protective switch, wherein the two portions are at a spacing from each other which is somewhat smaller than the thickness of the plug contact, and the two portions are elastically movable relative to each other. Therefore, for the purposes of connecting the protective switch to the access socket, the flat contact or the contact blade of the protective switch only has to be passed between the two portions. As the thickness of the contact blade of the protective switch somewhat exceeds the spacing between the two portions, the two portions are bent away from each other somewhat by virtue of insertion of the contact blade so that this affords a reliable electrical contact between the two portions of the contact element on the one hand and the contact blade of the protective switch on the other hand.

For many situations of use, it is advantageous if the contact element has two consumer tappings. The two consumer tappings preferably extend in opposite directions substantially perpendicularly from the element which connects the access connection and the consumer tapping. That permits two tappings on the same protected branch without the two plug connections impeding each other in terms of space.

The neutral conductor or the earth potential can be fed to the consumers independently of the protected potential lines. In a particularly preferred arrangement there is second bus bar having at least two connection contacts which are preferably in the form of flat plugs and which extend in opposite directions from the second bus bar, wherein at least two connection contacts which extend in opposite directions are formed in one piece. The risk of the components becoming unsoldered during a short-term overload can be eliminated by virtue of the one-piece configuration. In addition the pair of connection contacts can be fitted from one side of the second bus bar so that a component fitting and soldering procedure by machine is possible.

In a particularly preferred feature at least two connection contacts which extend in opposite directions are in the form of a stamped bent member. The design in the form of stamped bent members on the one hand permits inexpensive manufacture. On the other hand, that ensures that there are no contact locations and therewith no unwanted contact resistances, while additionally ensuring that the thickness of the connection contacts is constant.

A particularly desirable embodiment is one in which the pairs of connection contacts which are formed in one piece are riveted to the second bus bar. In contrast to the known embodiments in which the individual connection contacts are soldered into the circuit board or the bus bar, the riveting operation guarantees that the connection contacts are secured to the bus bars in a reliable and inexpensive manner. While, in the known embodiments, for soldering the connection contacts to into place, firstly small holes have to be drilled in the bus bar so that the connection contacts can be soldered into the holes in a further processing step, the riveted embodiment according to the invention can provide that firstly holes are stamped into the bus bar, and then the pair of connection contacts is riveted thereinto. The stamping operation is markedly less expensive than the otherwise conventional drilling procedure. In addition, the soldering operation itself is extremely difficult because of different thicknesses of material in regard to the flat contacts of the connection contacts and the bus bars. There is the risk of cold soldered locations because of the high calorific capacity of the bus bars. With one working operation therefore it is possible to secure two connection contacts to the bus bar. That can be effected by machine. In contrast thereto, the connection contacts in the known embodiments have to be individually soldered onto the bus bar, while at least one side has to be soldered in place by hand.

It will be appreciated that the one-piece design configuration of the connection contacts can also be used to advantage in embodiments in which the contact element does not comprise a one-piece member. On the contrary, it is essential that the load current-carrying connections or contacts are made from a one-piece member. It is possible for a different number of contact elements to be arranged in a row with each other, according to the number of connections required.

In the case of the known current distributor it is provided that, besides the load-carrying contact blade, the protective switch also has additional connections for the signalling lines. Such a protective switch is expensive to produce but it is necessary in the known embodiments as it is only when the protective switch is triggered that signalling is implemented by way of the signalling line. A further object of the present invention is to simplify the signalling circuit so that the current distributor can be equipped with simple protective switches with only load current-carrying contact blades. That object which moreover can also be implemented independently of the one-piece nature of the contact element or the one-piece nature of the connection contacts of the second bus bar is attained in that a first signalling line is electrically connected to the first bus bar and all contact elements are respectively connected by way of a diode to the second signalling line. That circuitry configuration means that it is possible to avoid any connection contacts of the signalling circuit to the protective switch. The first signalling line is connected directed to the first bus bar. The connection of the second signalling line to each individual contact element is made by way of a simple diode which excites a switching relay for signalling a triggered protective switch. That arrangement eliminates the plug contacts for the signalling lines and likewise assembly problems which are linked thereto. In addition a diode is markedly less expensive than the hitherto usual auxiliary switch which was integrated into the protective switch.

A particularly preferred embodiment is one in which the signalling lines are arranged on a circuit board. That permits simple and in particular inexpensive production of the signalling lines by machine.

It is particularly desirable if provided on the circuit board are connection islands which are each associated with a respective contact element, wherein the connection island is electrically connected to the associated contact element and connected to the second signalling line by way of a diode. That means that the diode can already be connected in the procedure of component fitment on the circuit board by machine. For the purposes of connecting the contact element, the contact element now only has to be connected to the connection island. In that case the connecting connections of the diode no longer have to be separated.

A particularly preferred embodiment is one in which the diode is integrated into the circuit board. The fact that the circuit board already has a diode means that it is possible to save on an additional component. It is therefore only necessary to connect the respective contact elements to a corresponding connection surface of the circuit board, which in turn is connected by way of the integrated diode to the second signalling line.

In accordance with another embodiment of the invention the diode is in the form of an LED, that is to say a light emitting diode. In the case of known heavy duty switches or circuit breakers, it is possible to see from the position of the switching lever whether they are switched on or off. In regard to such switches therefore it is possible to obtain a sum signal and to see on the spot which heavy duty switch or circuit breaker has triggered. That cannot be seen in the case of a fuse cartridge. If now in accordance with the invention, in the case of a current distributor of the foregoing kind, with the connection of a signalling line by way of a diode, that diode is in the form of an LED, it is advantageously possible to see which fuse has switched because the diode lights up.

For that purpose the surface of the housing should desirably be provided on the outside with a window. Alternatively, it is proposed that a light guide lead from the diode to the surface of the housing.

Figure 5A:
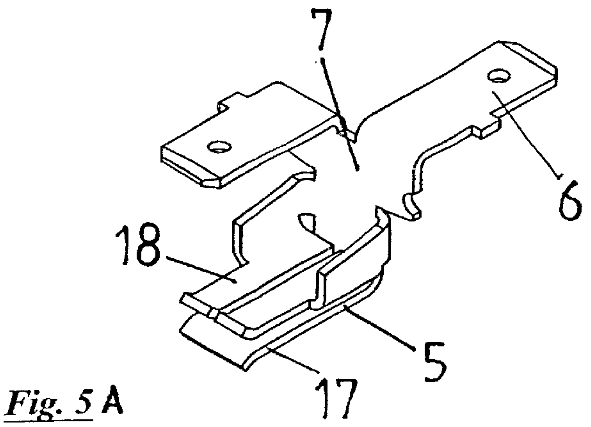
Figure 5B:
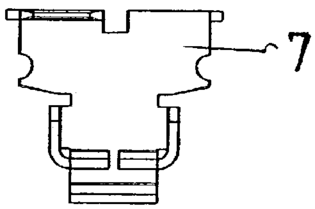
Figure 5C:
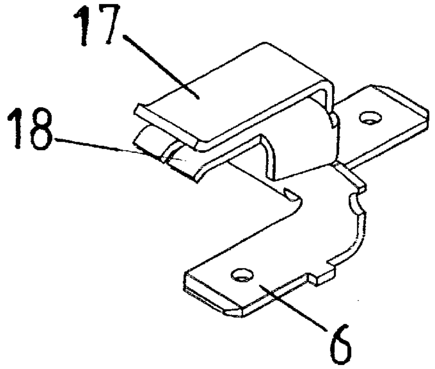
Figure 8:
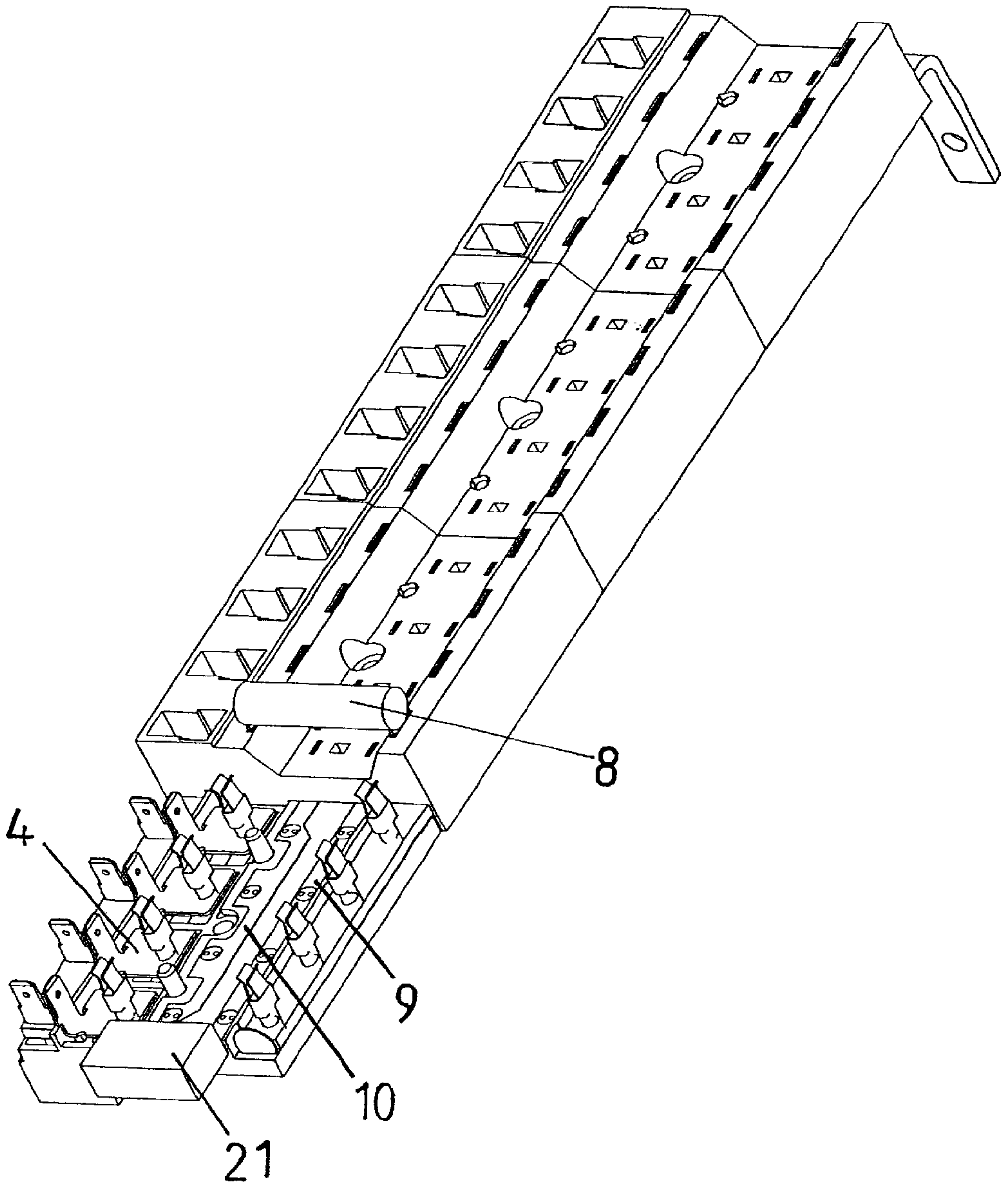
Figure 9:
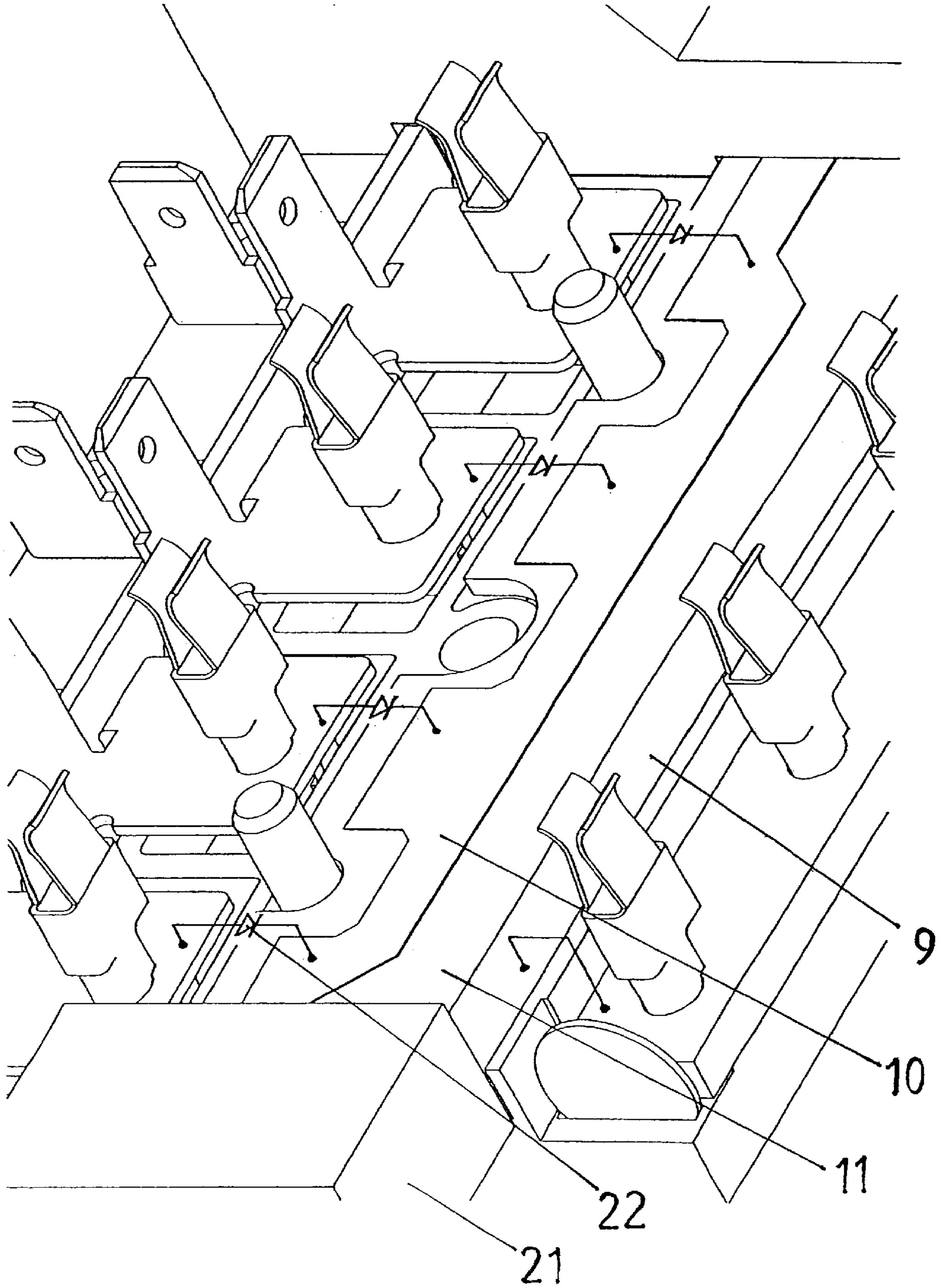
Figure 10:
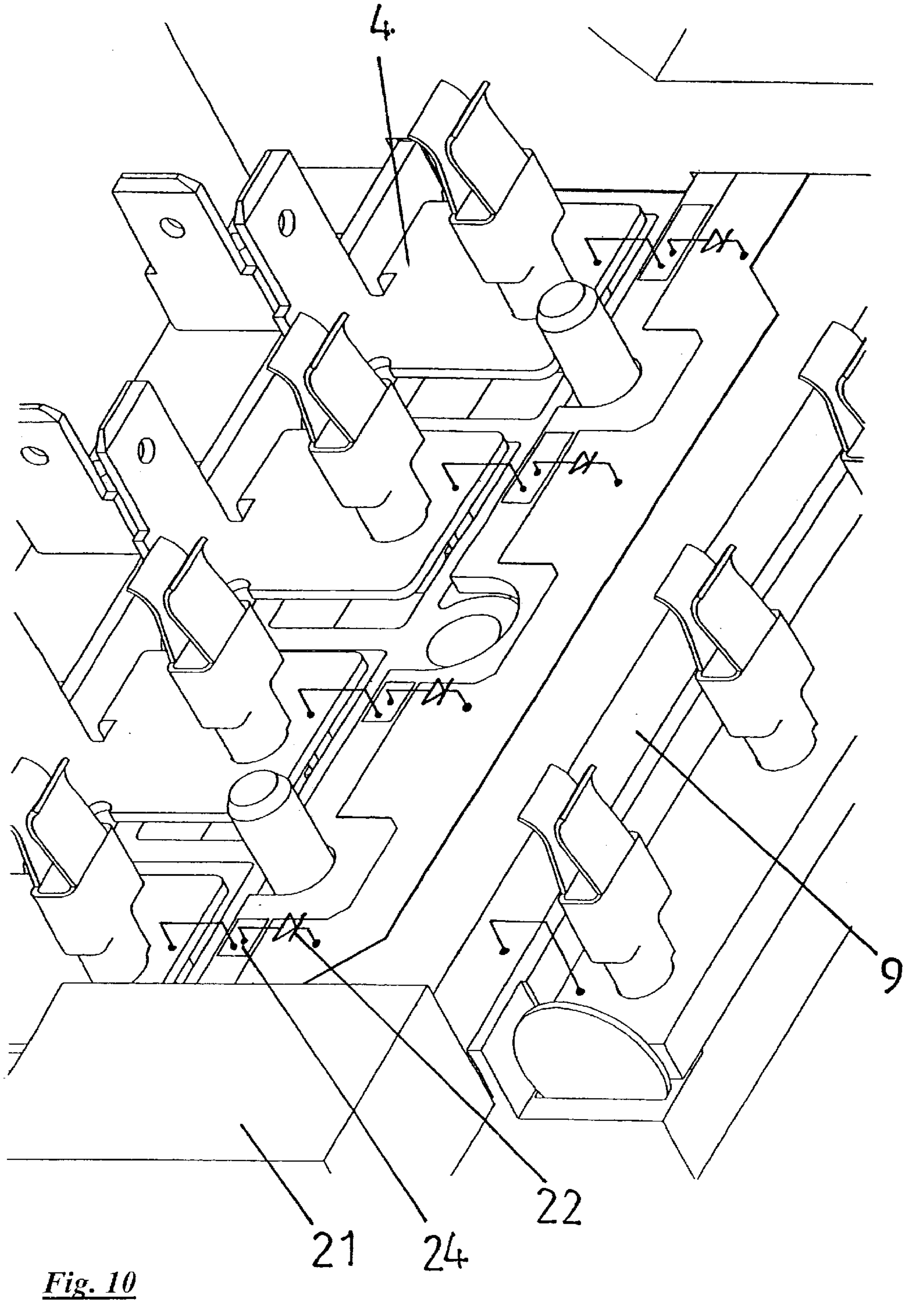
Figure 11:
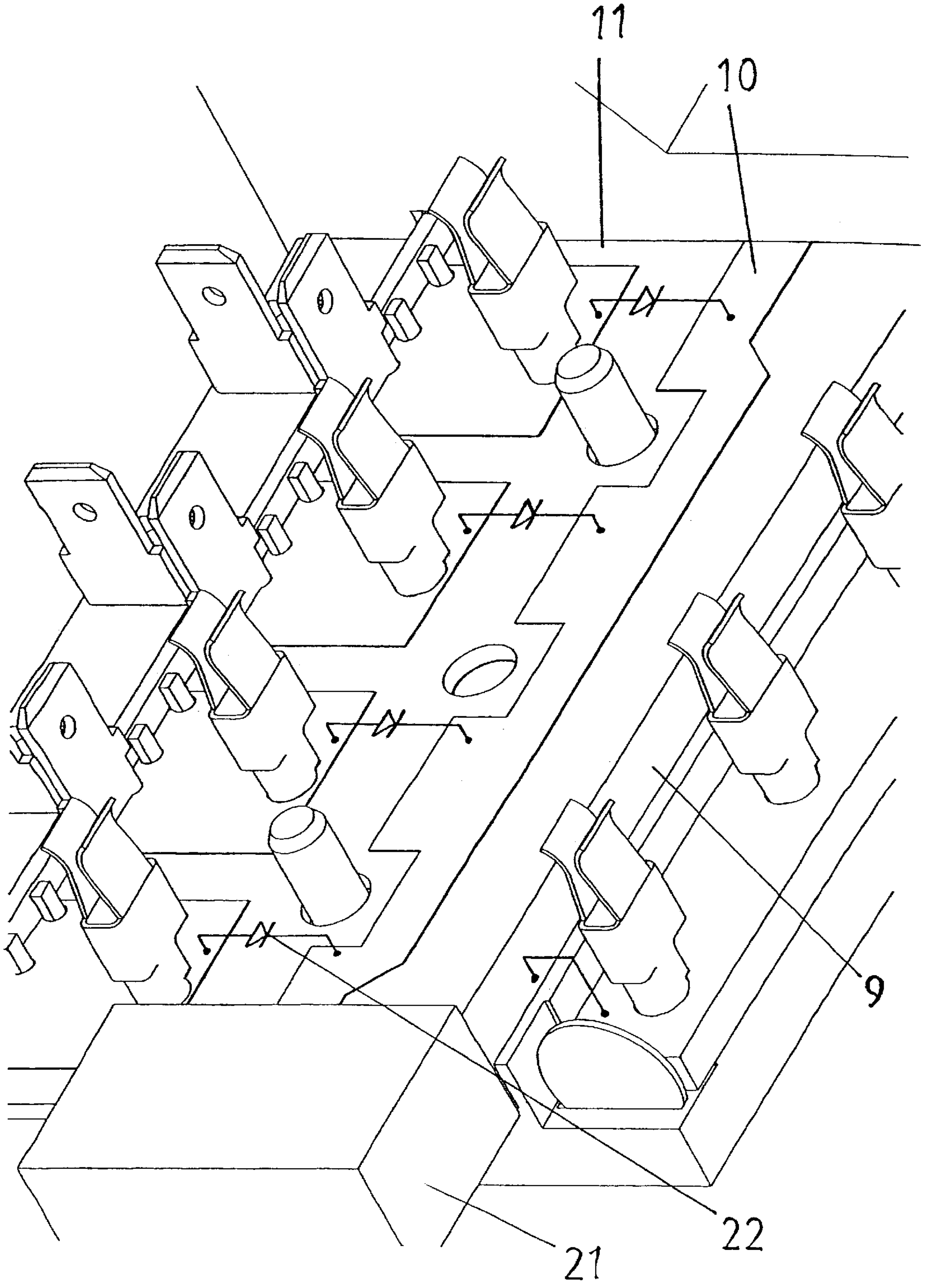

Further advantages, features and possible uses of the present invention will be apparent from the description hereinafter of some preferred embodiments and the accompanying drawings in which:

FIG. 1 shows a perspective view of a first embodiment of the current distributor according to the invention, FIGS. 2A and 2B show a first embodiment of a contact element, FIGS. 3A and 3B show a second embodiment of a contact element, FIGS. 4A and 4B show a third embodiment of a contact element, FIGS. 5A, 5B and 5C show a fourth embodiment of a contact element, FIGS. 6A and 6B show a fifth embodiment of a contact element, FIGS. 7A and 7B show an embodiment of the second bus bar, FIG. 8 shows an embodiment of the current distributor according to the invention without connection sockets for the signalling lines, FIG. 9 shows a perspective detail view of a first embodiment of the signalling circuit according to the invention, FIG. 10 shows a perspective detail view of a second embodiment of the signalling circuit according to the invention, and FIG. 11 shows a perspective detail view of a third embodiment of the signalling circuit according to the invention.

Referring to FIG. 1 shown therein is a perspective view of a first embodiment of the current distributor according to the invention. The current distributor 1 has a bus bar 2 and a row of plug sockets 3 which are connected to the bus bar 2. There is also provided a contact element 4 which comprises an access connection 5, a consumer tapping 6 (FIG. 2) and an element 7 connecting the access connection to the consumer tapping. There is also a plug connection for the plug contacts of a protective switch 8. The plug connection has plug socket 3 of the bus bar 2 and an access connection 5 of the contact element 4. There are additionally provided two signaling lines 9, 10. All voltage-carrying elements are accommodated in a housing comprising a lower housing portion 12 and an upper housing portion 13. The current distributor 1 is connected in such a way that the bus bar 2 is current-carrying. By fitting protective switches 8 into the corresponding openings of the upper housing portion 13, a respective contact element 4 is connected by way of the protective switch 8 to the bus bar 2. The contact element 4 has two consumer tappings 6 to which any load can be connected. The neutral conductor or the earth potential is made available here by way of a second bus bar 15 which has connection contacts 19. Provided in the upper housing portion 13 are appropriate openings into each of which respectively project an access connection 5 and a connection contact 19. That arrangement forms a plug socket 23 into which a suitable plug can be fitted. Therefore a suitable load can be connected to the consumer tapping 6 and at the same time connected to earth potential by way of the connection contacts 19.

By virtue of the current distributor 1, it is possible to provide a plurality of consumer tappings 6 in safeguarded configuration. In addition there are two signalling lines 9, 10, by way of which the triggering of a protective switch can be signalled. For that purpose, it is possible to use for example special protective switches 8 which have additional connection contact blades which come into engagement with the corresponding connection sockets 14 of the signalling lines. If now one of the protective switches 8 triggers, then an auxiliary switch is actuated in the protective switch 8 and electrically connects the two signalling lines 9 and 10. That can be detected at a remote location so it is possible to transmit a corresponding signal which makes it clear that at least one protective switch 8 has triggered.

Various embodiments of the contact element 4 are shown in FIGS. 2 to 6.

FIGS. 2A and 2B show two views of a contact element according to the invention. The contact element 4 comprises an access connection 5, two consumer tappings 6 and a connecting element 7 which connects the consumer tapping 6 and the access connection 5. A secondary or separate plug 16 is soldered or pressed into the access connection 5. The soldered-in secondary or separate contact provides a better plug-in force.

FIGS. 3 to 6 show alternative embodiments of the contact element. The contact element in all embodiments is in the form of a stamped bent member of a thickness of about 0.8 mm. That ensures a current-carrying capability of between 10 and 35 amperes. The embodiments of the contact element 4 in FIGS. 3 to 6 have in common the fact that the access connection 5 is in the form of an access socket so that there is no need to solder or press a secondary plug 16 therein, as is shown in FIGS. 2A and 2B. In the region of the access socket the contact element 4 or the access connection 5 has two portions 17 and 18 forming a receiving means for the plug contacts of the protective switch, wherein the two portions 17 and 18 are at a spacing from each other which is somewhat smaller than the thickness of the plug contact. In addition the two portions 17 and 18 are elastically movable relative to each other. Therefore, a blade contact of a protective switch 8 can be inserted between the two portions 17 and 18 so that the elastic biasing of the two portions 17 and 18 towards each other affords a firm and in particular electrically conductive contact between the access connection 5 and the contact blade of the protective switch 8.

The second bus bar 15 of FIG. 1 is shown individually once again in FIGS. 7A and 7B. In this case the second bus bar 15 which functions as a neutral conductor or earth potential has a row of connection contacts 19 which extend in opposite directions perpendicularly in relation to the second bus bar. It can be clearly seen in particular from FIG. 7A that each two connection contacts 19 which extend in opposite directions are formed in one piece as a stamped bent member. A stamped bent member therefore forms a pair of connection contacts. These pairs are simply riveted to the second bus bar 15. For the production procedure therefore, firstly for example the corresponding members are stamped out of a metal sheet and bent. Holes are stamped into the second bus bar 15 so that the pairs of connection contacts 19 can be fixed to the second bus bar 15 by way of a rivet 20. That affords a secure electrical connection which is also capable of carrying a high electric load.

FIG. 8 shows a perspective view of a further embodiment of the current distributor according to the invention. It can be clearly seen that, in contrast to the embodiment of FIG. 1, the signalling lines 9 and 10 here do not have any connection sockets 14. A switching relay 21 however can be found here. The circuitry of the individual signalling lines is shown in FIGS. 9, 10 and 11 for three different embodiments. In all cases the first signalling line 9 is electrically connected to the bus bar 2. Each contact element 4 is connected by way of a respective diode 22 to the second signalling line 10. Both signalling lines 9 and 10 are connected to the switching relay 21. When the protective switch 8 is switched on the two signalling lines 9, 10 are at the same potential. That changes when the protective switch 8 triggers. Then, the corresponding contact element 4 draws the potential of the second signalling line 10 to the earth potential. The diodes 22 of the other contact elements 4 ensure that those contact elements 4 still remain at the potential of the bus bar 2. The potential difference between the two signalling lines 9, 10 is detected by way of the switching relay 21. Accordingly in this case also, without the protective switches 8 having additional auxiliary switches, it is possible for a triggered protective switch to be detected, without connection sockets having to be provided on the signalling lines.

As shown in FIG. 9, it is sufficient if a diode is simply soldered in position between the contact element 4 and the second signalling line 10. An embodiment which is less susceptible to trouble is shown in FIG. 10. The two signalling lines 9, 10 are formed on a circuit board. Also disposed on the circuit board are connection islands 24 which are each associated with a respective contact element 4. The connection islands 24 are each connected by way of a respective diode 22 to the second signalling line 10. In this case only the contact element 4 has to be connected to the connection island 24 in order to achieve the desired circuitry for the signalling circuit.

FIG. 11 shows a further embodiment of the signalling circuit configuration. In this case, not only are the two signalling lines 9 and 10 arranged on the circuit board, but in addition also the access connection 5 and the consumer tapping 6 of the contact element 4. A connection of the contact element 4 to the second signalling line 10 can then be made for example by a diode which is integrated into the circuit board. It will be clear by means of this example that the signalling circuit according to the invention can also be used to advantage in embodiments in which neither the contact element 4 nor the connection contacts 19 of the second bus bar 15 are formed in one piece.

LIST OF REFERENCES

1 current distributor
2 bus bar
3 plug socket
4 contact element
5 access connection
6 consumer tapping
7 connecting element
8 protective switch
9 first signalling line
10 second signalling line
11 circuit board
12 lower housing portion
13 upper housing portion
14 connection socket of the signalling lines
15 second bus bar
16 secondary plug
17 first portion of the access socket
18 second portion of the access socket
19 connection contacts
20 rivet
21 relay
22 diode
23 plug socket
24 connection islands

What is claimed is:

1. A current distributor comprising:

a bus bar;

at least one plug socket connected to said bus bar;

at least one contact element comprising:

an access connection;

a consumer tapping; and, an element connecting said access connection and said consumer tapping, wherein said contact element comprises a one piece member;

a protective switch having plug contacts, said plug contacts arranged to connect a respective one of said at least one contact element to said bus bar; and, at least two signaling lines arranged to indicate when said protective switch triggers.

2. A current distributor according to claim 1 characterized in that said access connection of said contact element has a secondary plug which is fitted therein.

3. A current distributor according to claim 2 wherein said secondary plug is soldered therein.

4. A current distributor according to claim 2 wherein said secondary plug is pressed therein.

5. A current distributor according to claim 1 characterized in that said access connection is in the form of an access socket.

6. A current distributor according to claim 2 characterized in that said contact element comprises a stamped bent member.

7. A current distributor according to claim 6 wherein said contact element has a thickness of between 0.4 and 1.2 mm.

8. A current distributor according to claim 6 wherein said contact element has a thickness of about 0.8 mm.

9. A current distributor according to claim 5 characterized in that in a region of said access socket has two portions which form a receiving means for a respective one of said plug contacts of said protective switch, wherein said two portions are at a spacing from each other which is somewhat smaller than the thickness of said respective one of said plug contacts, and said two portions are elastically movable relative to each other.

10. A current distributor according to claim 1 characterized in that said contact element has two consumer tapings.

11. A current distributor according to claim 1 characterized in that there is provided a second bus bar having at least two connection contacts extending in opposite directions from said second bus bar, wherein said at least two connection contacts which extend in opposite directions are formed in one piece.

12. A current distributor according to claim 11 wherein said connection contacts are in the form of blade contacts.

13. A current distributor according to claim 11 characterized in that said at least two connection contacts which extend in opposite directions are in the form of a stamped bent member.

14. A current distributor according to claim 11 characterized in that said at least two connection contacts which are formed in one piece are riveted to said second bus bar.

15. A current distributor according to claim 1 wherein said at least two signaling lines comprises a first signaling line electrically connected to said first bus bar and a second signaling line respectively connected by way of a diode to each of said at least one contact element.

16. A current distributor according to claim 15 characterized in that said first and second signaling lines are arranged on a circuit board.

17. A current distributor according to claim 16 characterized in that provided on said circuit board is at least one connection island which is electrically connected to an associated one of said at least one contact element and is connected to the second signaling line by way of a diode.

18. A current distributor according to claim 16 characterized in that said diode is integrated into the circuit board.

19. A current distributor according to claim 15 characterized in that said diode is in the form of a LED.

* * * * *